United States Patent [19]

Weiss

[11] 3,998,922

[45] Dec. 21, 1976

[54] METHOD OF MAKING A CANDLE IN A CONTAINER

[76] Inventor: Theodore H. Weiss, 7250 Schultz Road, Erie, Pa. 16509

[22] Filed: Jan. 28, 1976

[21] Appl. No.: 653,207

[52] U.S. Cl. ................................ 264/255; 264/262; 264/263; 264/268; 264/277; 264/279; 264/294; 264/299; 156/242; 156/293; 425/803; 431/289

[51] Int. Cl.[2] ............................................ B29D 3/00

[58] Field of Search .......... 264/259, 261, 255, 262, 264/245, 247, 263, 267, 271, 275, 277, 268, 279, 299, 294, 295, 250, 254; 425/117, 803; 431/126, 288, 289, 292, 291; 156/303.1, 242, 293

[56] References Cited

UNITED STATES PATENTS

| | | | |
|---|---|---|---|
| 345,272 | 7/1886 | Brown | 425/803 |
| 574,376 | 1/1887 | Baumer | 425/803 |
| 2,189,746 | 2/1940 | Candy | 425/803 |
| 2,481,019 | 9/1949 | Joyce | 431/126 |
| 2,520,682 | 8/1950 | Harrison et al. | 425/803 |
| 3,015,847 | 1/1962 | Holden et al. | 425/803 |
| 3,105,373 | 10/1963 | Villemure et al. | 431/288 |
| 3,286,492 | 11/1966 | Frazer | 431/126 |

*Primary Examiner*—Willard E. Hoag

[57] ABSTRACT

A method for making a candle is disclosed. The candle is made by filling an open-topped jar with a solidifiable fuel, suspending in the fuel a rod having a sheet metal plate connected to its lower end concentrically with the jar, allowing the fuel to solidify around the rod, removing the rod, inserting a wick into the hole left by the rod and into said plate and completely filling the jar.

The wax is dispensed into the jar by an improved circuit which includes a tank containing the heated wax and a pump which recirculates liquid wax through a pressure regulating valve. The wax is dispensed to the jars by timing valves.

4 Claims, 5 Drawing Figures

FIG. 1.
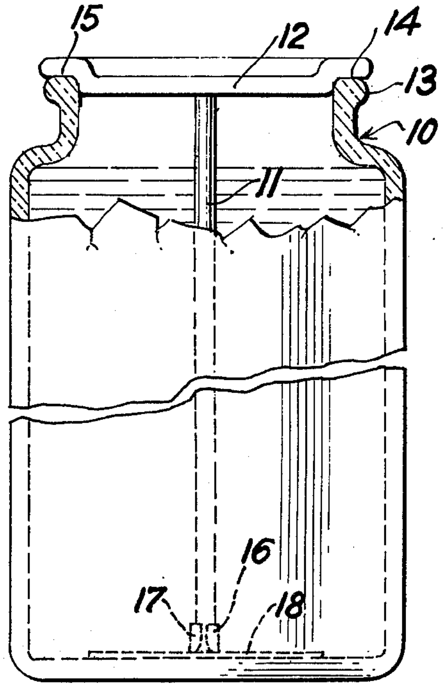
FIG. 2.
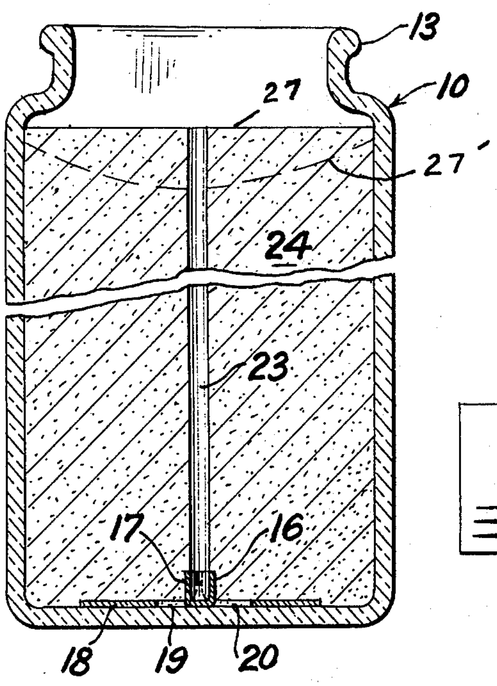
FIG. 3.
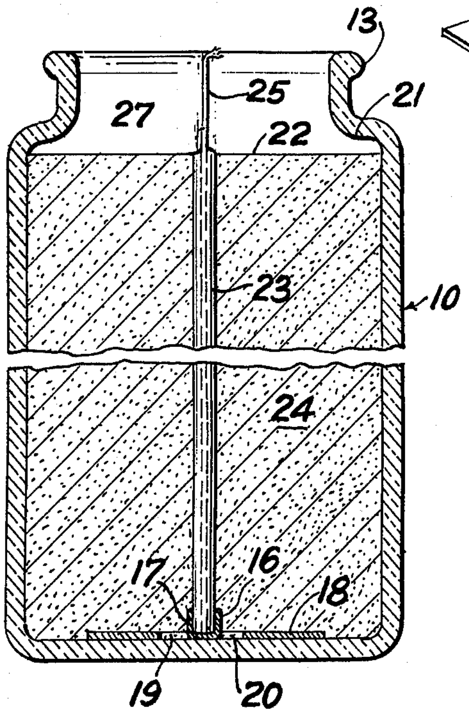
FIG. 4.
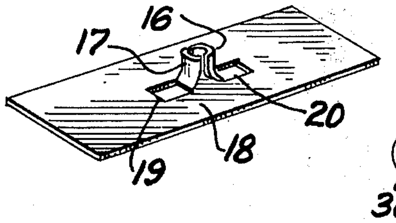
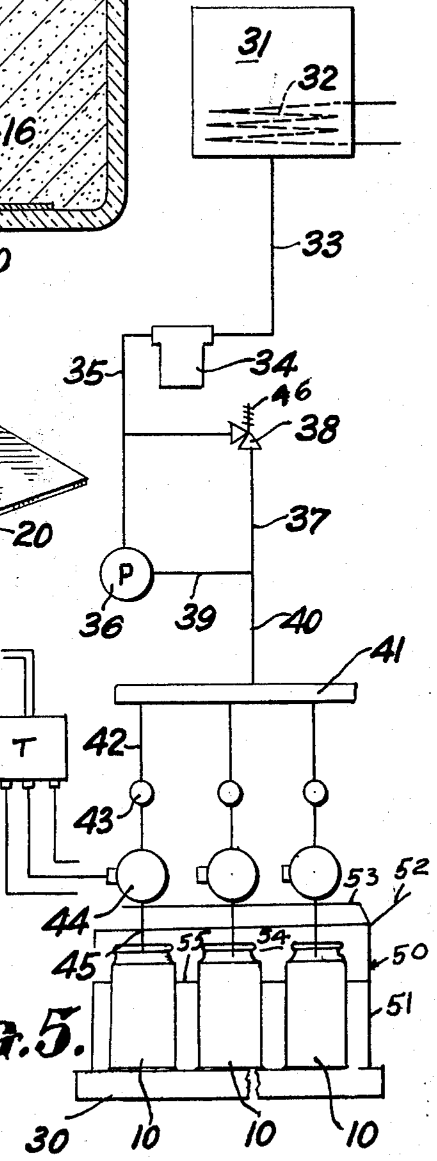
FIG. 5.

METHOD OF MAKING A CANDLE IN A CONTAINER

REFERENCE TO PRIOR ART

The candle and method for making it comprise an improvement over U.S. Pat. Nos. 345,272; 846,169; 995,711; 2,323,804; 2,443,757, 2,520,682; 2,709,538; 2,774,989; and 3,020,939, which are referred to herein to show the state of the art. None of these references disclose the method or apparatus claimed.

OBJECTS OF THE INVENTION

It is an object of the invention to provide an improved process for filling candles.

Another object of the invention is to provide a method and apparatus for making candles that is simple, efficient and economical and provides an improved product.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1 is a view partly in cross section of the jar showing the rod in place.

FIG. 2 shows the jar partly filled, with the rod removed.

FIG. 3 shows the candle with the wick in place.

FIG. 4 shows the plate to be located at the bottom of the jar.

FIG. 5 shows a diagram of the piping circuit for filling the candle jars.

DETAILED DESCRIPTION OF THE DRAWINGS

Now, with more particular reference to the drawings, the candles are made in jars 10 which are frequently shipped in cartons containing twelve jars, four rows in one direction and three rows in the other direction, in a carton separated by partitions. The carton is indicated generally at 50 and may be rectangular in shape and have ends 51 with end flaps 52 and rear flaps 53 connected to the rear wall 54. The jars are separated by partitions indicated at 55 in a usual manner.

The jars 10 are shown with an intermediate part broken away indicating that they can be of any desired length relative to their height. They terminate at the upper end in a rim 13 and a flat bottom on which the plate 18 may rest.

The rods 11 may be a generally round rod and could be, for example, an eighth of an inch in diameter fixed to the bracket 12 in a suitable manner such as, for example, by welding, brazing or by a suitable adhesive. The plate 18 may be made of thin sheet metal such as steel, aluminum or the like and the ears 16 and 17 may be struck upwardly from the openings 19 and 20 in the plate 18 and may be formed to receive and frictionally engage the lower end of the rod 12.

To carry out the process, the user will rest a carton 50 of jars on a table 30 with the jars in place in the carton, with one jar under each nozzle. By proper switching, any of the solenoid valves can be shut off in order to fill 12 or any number of jars less than 12. With the heater 32 in tank 21 operating to liquify the wax in tank 31, he will start pump 36 which will recirculate wax from line 33 through filter 34 and line 35 through the lines 39 and 37 and relief valve 38 having a control 46 set for the desired pressure.

The user will then actuate the timer T which will open the solenoid valves 44 for a predetermined time and allow liquid wax to flow from line 40, manifold 41, metering valves 43, lines 45 into the jars in the carton 50. The user will then take rods 11 and fit a plate 18 onto the lower end of each rod 11 and insert a rod with the plate 18 thereon into each jar that has been filled, with the bracket 12 resting on the rims 13 at 14 and 15 and the plate 18 in each case floating just above the center of the flat bottom of each jar. Thus the rod 11 automatically settles to a central position each time it is suspended in a jar.

The operator will then allow the wax in each jar to solidify and, in so solidifying, the wax 24, which has been filled up to a level such as indicated by line 27, for example, may shrink to the level 27'. The operator will then remove the rods 11 with bracket 12, leaving the plate 18 in place in the bottom of the jar impotted in the wax. He will then insert a wick 25 into the hole 23 left by each rod which extends down to the bottom of the jar into the space between the ears 16 and 17. Then he will reset the timer to dispense a small amount of wax for topping the jars, filling the area left by shrinkage and thereby getting additional wax into the jar and, at the same time, sealing the wick 25 to the wax.

The cartons can then be closed, bringing the end and rear flaps 52 and 53 over the tops of the jars in a manner familiar to those skilled in the art. As the user burns the candle, and in its final hours of life, all of the wax at the bottom of the jar liquifies and the ears 16 and 17 will support the wick in the liquid wax and wax will flow in between the ears to the wick and the wax can be completely used up, even after all wax has melted around the wick.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. The method for making a candle in an open topped jar comprising:

introducing a solidifiable fuel into said jar;

frictionally engaging an end portion of a rod between plural, spaced projecting portions of a plate and inserting a portion of said rod with said plate supported thereon into said fuel in said jar; allowing said fuel to solidify around said plate and said rod; removing said rod from said plate and said fuel leaving an aperture in said fuel;

inserting a wick into said aperture and between said spaced projecting portions;

and adding additional said fuel to raise the level thereof to compensate for shrinkage and to seal said wick in place; thereby forming said candle.

2. The process recited in claim 1 wherein said open topped jars have rims and said rod is supported on a bracket which rests on said rims.

3. The process recited in claim 1 wherein said jars are supported in a carton containing a plurality of such jars without removing any jars from the carton, supporting the carton of said jars adjacent a filling machine.

4. The method recited in claim 1 wherein said rod is disposed at its lower end between said ears thereby providing a hole in said solidified fuel that extends down into said ears whereby said wick is supported by said ears independent of said fuel.

* * * * *